DIGITAL STORAGE AND GENERATION OF VIDEO SIGNALS

Filed Oct. 16, 1963 4 Sheets-Sheet 1

INVENTORS:
DONALD A. COLE,
CARL R. CORSON &
ARTHUR C. STOCKER
BY Edward J. Norton
Attorney

DIGITAL STORAGE AND GENERATION OF VIDEO SIGNALS

Filed Oct. 16, 1963 4 Sheets-Sheet 2

INVENTORS:
DONALD A. COLE,
CARL R. CORSON &
ARTHUR C. STOCKER
BY Edward J. Norton
Attorney

DIGITAL STORAGE AND GENERATION OF VIDEO SIGNALS

Filed Oct. 16, 1963 4 Sheets-Sheet 3

INVENTORS:
DONALD A. COLE,
CARL R. CORSON &
ARTHUR C. STOCKER
BY Edward J. Norton
Attorney

DIGITAL STORAGE AND GENERATION OF VIDEO SIGNALS

Filed Oct. 16, 1963 4 Sheets-Sheet 4

INVENTORS
DONALD A. COLE,
CARL R. CORSON &
ARTHUR C. STOCKER

By Edward J. Norton
Attorney

United States Patent Office 3,345,458

Patented Oct. 3, 1967

3,345,458
DIGITAL STORAGE AND GENERATION OF VIDEO SIGNALS

Donald A. Cole, Oahu, Hawaii, Carl R. Corson, Canoga Park, Calif., and Arthur C. Stocker, Moorestown, N.J., assignors to Radio Corporation of America, a corporation of Delaware Filed Oct. 16, 1963, Ser. No. 316,581
6 Claims. (Cl. 178—6.8)

ABSTRACT OF THE DISCLOSURE

Disclosed is apparatus for displaying on a standard television monitor a selected one of a plurality of messages digitally stored within a memory. An AND gate matrix is responsive to digital data read out from the memory as well as to timing control signals applied thereto from a synchronizing source for digitally generating the video signal utilized by the standard television monitor.

This invention relates to digital data processing systems and, particularly, to an improved system using digital techniques for selectively displaying stored data as a message page on a standard television cathode ray tube.

A number of applications exist for a system which will receive data in the form of different messages composed of digitalized or coded character intelligence, store the messages as they become available, and display the messages as needed. One example of such a data system is the reservation system used by transportation companies. Data as to the reservations made and confirmed on different departures, as well as other information concerning each departure, are maintained at a central location. When an office in the field wishes the data as to a particular departure, a request for that data is forwarded to the central location which then makes the data requested available at the office in message form.

The desirability of providing a television display for the data in such a system has been recognized. In addition to providing an all-electronic operation, a television display serves to present the data more rapidly and in a more usable form as compared to other display means. A television display is more flexible in its application than, for example, an electromechanical page printer. Considerable effort has been devoted to providing arrangements for reproducing data on television displays.

One approach to providing a data system as described above is a system in which data in digital (coded) form is forwarded from various remote points to a central location. The data is typed out on page printers as it is being received. An operator then transfers by manual means the information represented by the received data to display boards or panels. The camera of a closed circuit television system then scans the display boards, providing a television display of the data at various remote points. Other approaches have been suggested using a type of shaped beam tube and an electronic camera or a symbol pattern generator and a Graphecon storage-converter tube. Still other approaches have been suggested using a magnetic recording surface area upon which the characters in a data message are shaped and arranged in the actual pattern of a message page to be displayed. Means are provided for scanning the surface area to produce a signal suitable for application to a television display device.

The philosophy of operation is similar in each of the approaches outlined above. Both the shape of the characters and their relative location on a message page are duplicated on a surface; one with ink, one with electric charges, and one with magnetic domains. The presence of the pattern corresponding to the arrangement and shape of the characters on the message page to be displayed is a part of the system. The shape of the characters and their position on the message page is produced in analogue form with the operation depending on the sensing of the analogue to produce the television display.

In the case where display boards are used with a closed circuit television system, the operation is subject to human error as well as excessive time delay. The storage tube used in other approaches deteriorate with time, introducing time dependents in the system. Since the approaches referred to above are all dependent upon the sensing of an analogue form, they are subject to noise pick-up resulting in loss of definition. Receiving a data message in digital form which is first translated into and stored in an analogue form before actual display limits the speed of operation, and deprives the display system of the advantages otherwise obtainable by the use of digital techniques.

It is an object of the invention, therefore, to provide an improved system for generating a video signal by using only digital techniques.

Another object is to provide an improved system using digital techniques for storing data and for displaying the stored data on a standard television cathode ray tube.

A further object is to provide an improved system which stores in digital form data messages composed of coded character intelligence and by using only digital techniques selectively translates the stored messages into a form suitable for display as different message pages on a standard television tube.

A still further object is to provide an improved system using only digital techniques for storing data messages and for converting the stored messages into a signal form suitable for display on a cathode ray tube using a television raster scan operation.

Briefly, in the embodiment described herein, a random access, ferrite magnetic core memory device is provided. Data messages in the form of binary signals each composed of digitalized or coded character intelligence are written into the memory device so that the data messages are retained in the memory device in digital form. Message select means are provided for reading out of the memory device the combination of coded characters included in the particular one of the data messages which it is desired to display.

In one embodiment of the invention, in displaying a data message stored in the memory device, the coded characters corresponding to the first row of characters appearing on the selected message page to be displayed are read out of the memory device. Digital techniques are used to translate the coded characters into a video signal which, when distributed by horizontal scanning, defines a portion of each character in the row. When the first row of characters has been completely displayed by the application of the successive scan lines to the television tube, the coded characters corresponding to the next row of characters on the message page to be displayed are read out of the memory device, processed by digital techniques into a video signal, and displayed on the television tube by the application of the successive scan lines thereto. Any desired number of rows of characters forming the data message on the message page are in this manner displayed on the television tube for viewing by an operator.

A more detailed description of the invention will now be given in connection with the drawing, in which.

Figure 1:
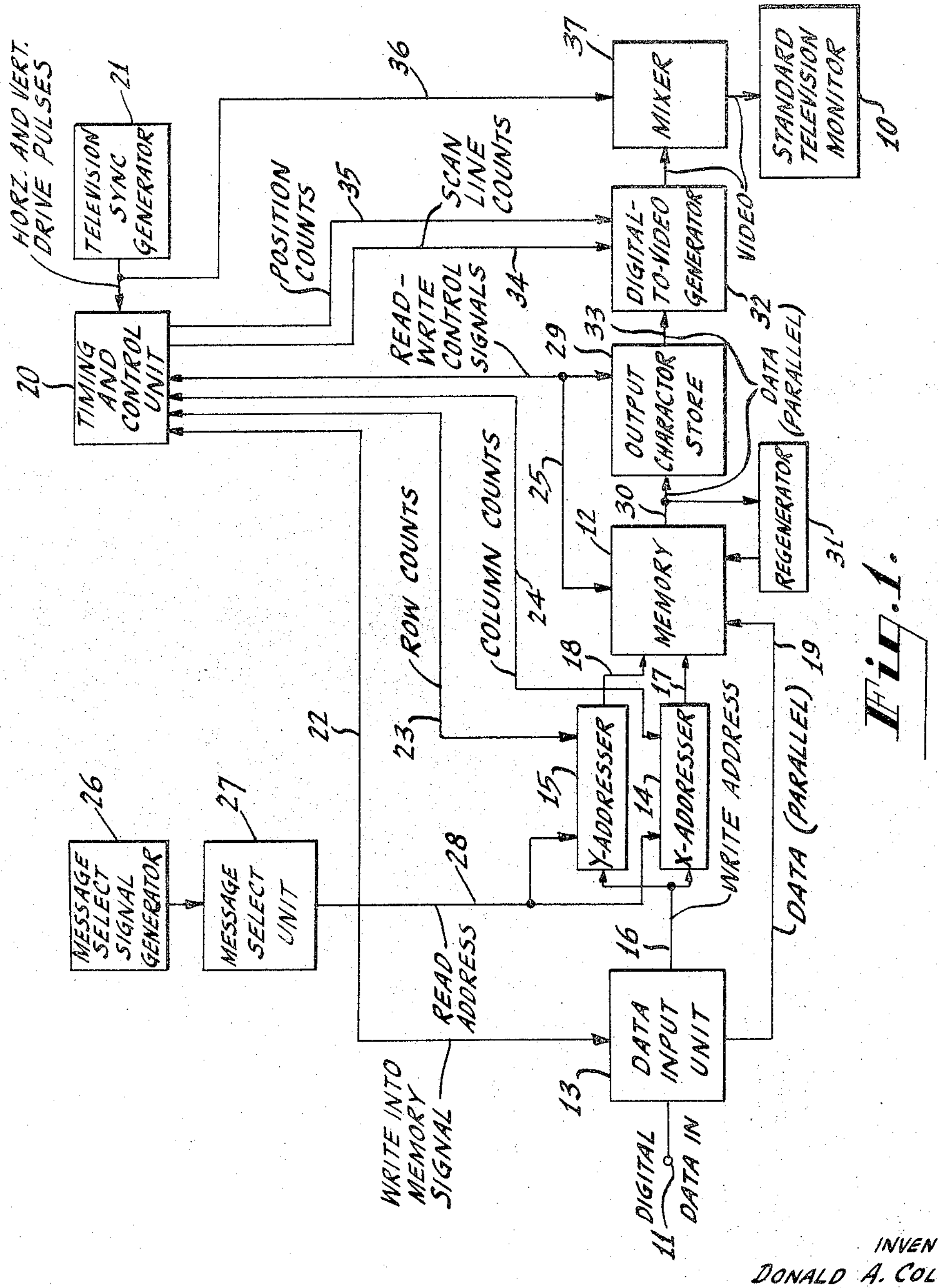
FIGURE 1 is a block diagram of one embodiment of a system for the digital storage and generation of video signals constructed according to the invention.

A standard television monitor 10 upon which it is desired to display different data messages arranged in a page-like presentation is shown in FIG. 1. The data messages which are to be visibly displayed on the monitor 10 are applied to an input terminal 11. The messages are each in the form of a binary type of digital data signal in which the coded characters are defined by different combinations of serially appearing time periods during which the received data signal is at either one of two levels or values. The time periods are commonly identified as mark or "1" bit intervals for one level of the received data signal and space or "0" bit intervals for the other level of the received data signal.

It will be assumed, by way of example, that the data messages use a six-bit code with each coded character in the messages being defined by a particular combination of six mark and space bit intervals. Up to sixty-four different combinations of bit intervals are available, defining sixty-four different coded characters. By way of example, a standard 5-bit teletype code may be used with a sixth bit being added for each character to provide an upper case or lower case designation also referred to as a letter-numeric designation. The received data messages can be applied to the input terminal 11 from a conventional teletype system, a computer, a paper or magnetic tape equipment, a card reading equipment or any other equipment capable of producing character intelligence in coded form.

A memory device 12 is also shown in FIG. 1. The memory device 12 can be a random access, ferrite magnetic core arrangement including suitable circuitry for operation in the coincident current mode or any other type commonly used in computer application. It will be assumed that the data processing system shown in the embodiment of FIG. 1 is intended to provide two different data messages for selective display on the monitor 10. Each data message includes up to 512 six-bit coded characters which are to form a part of the display. Since two different data messages are to be stored for display as needed, the memory device 12 requires a capacity of 1024 six-bit coded characters. The magnetic cores in the memory device 12 can be arranged in an array of six planes each including thirty-two cores spaced in a horizontal or X-direction and thirty-two cores spaced in a vertical or Y-direction for a total of 6144 magnetic cores or storage elements.

Each of the data message signals received at the input terminal 11 includes, in addition to the coded character intelligence to be displayed on the monitor 10, a header or combination of coded characters at the beginning of the message. The header identifies the receeived data message as one to be stored for later display and includes information as to the location and manner in which the coded characters forming the display are to be written into and held in the memory device 12. A data input unit 13 which can consist of a coincident logic circuit arrangement of gates and bistable devices examines a received data message applied thereto from the input terminal 11. The data input unit 13 determines whether the received data message is in proper form for handling by the display system and is responsive to the information contained in the header of the received data message to produce a write address signal.

The write address signal is applied to an X-addresser 14 and to a Y-addresser 15 over connections represented by lead 16. The X-addresser 14 and the Y-addresser 15, which can include shift registers, as well as gating and bistable devices, for performing pulse switching and similar functions, are responsive to the write address signal to generate signals over connections represented by leads 17 and 18, respectively, defining the location of the particular magnetic cores in the magnetic core array of the memory device 12 into which the six-bit coded characters in the received data message are to be inserted. The X-addresser 14 output signal defines the location in the horizontal direction of the magnetic core array, while the Y-addresser 15 output signal defines the location in the vertical direction of the magnetic core array.

The memory device 12 operates in response to the signals received from the X-addresser 14 and the Y-addresser 15 over leads 17 and 18, respectively, to store the six-bit coded characters received in parallel form from the data input unit 13 over connections represented by lead 19. Only the six-bit coded characters forming the message to be displayed on the monitor 10 are fed over lead 19 to the memory device 12 from the data input unit 13 for storage by the memory device 12. Since the presence of the combination of coded characters forming the header in the received data message is necessary only to properly generate the write address signal, these coded characters are no longer needed once this function has been performed and may be destructively processed in the data input unit 13.

A timing and control unit 20 including pulse counting chains and other arrangements for producing pulse trains of given frequency and distribution is shown in FIG. 1 as being responsive to horizontal and vertical drive pulses supplied by a television sync generator 21. As brought out in the discussion below of the operation of the data processing system, the timing and control unit 20 serves to supply the proper timing and control information to the data input unit 13 over connections represented by lead 22. The proper timing and control information is also fed from the timing and control unit 20 to the Y-addresser 15 over connections represented by lead 23, to the X-addresser 14 over connections represented by lead 24, and to the memory device 12 over connections represented by lead 25.

The data input unit 13, the X-addresser 14, the Y-addresser 15 and the timing and control unit 20 so far described constitute a write-in circuit arrangement for the memory device 12. As the data messages are received at the input terminal 11, they are processed by the data input unit 13. The coded characters to be stored for later display in the form of message pages on the monitor 10 are fed to and placed in the memory device 12 in accordance with the instructions supplied by the X-addresser 14 and the Y-addresser 15. The data input unit 13, the X-addresser 14, the Y-addresser 15, the timing and control unit 20 and the memory device 12 may be constructed using known computer techniques.

A message select signal generator 26 is shown at the upper left hand corner of FIG. 1. The message select signal generator 26 may be a manual keyboard or any other means for selectively applying one of a plurality of control signals to a message select unit 27. The message select signal generator 26 may be arranged to supply different direct current levels, different frequency tones or coded pulse signals. The message select unit 27, which may be constructed as a coincident logic circuit arrangement employing gating and bistable devices in the manner of the data input unit 13, is responsive to a particular control signal received from the message select signal generator 26 to produce a read address signal defining one of the data messages stored in the memory device 12 for display on the monitor 10. The read address signal which is applied from the message select unit 27 to the X-addresser 14 and the Y-addresser 15 over connections represented by lead 28 includes information as to the location in the memory device 12 of the six-bit coded characters included in the data message selected for display. The Y-addresser 15 and the X-addresser 14 are responsive to the read address signal received over lead 28 and to the timing and control information received over the respective leads 23 and 24 from the timing and control unit 20 to apply the proper character read-out signals at the proper times to the memory device 12 over leads 18 and 17, respectively.

The memory device 12 is responsive to the signals received from the X and Y addressers 14, 15 and to the timing and control information received from the timing and control unit 20 over lead 25 to provide at its output the six-bit coded characters included in the data message selected by the message select signal generator 26 for display on the monitor 10. The six-bit coded characters appear at the output of the memory device 12 one at a time in parallel form and are applied from the output of the memory device 12 to an output character store 29 over connections represented by lead 30. At the same time, the six-bit coded characters may be fed to a regenerator 31 which serves to process the coded character signals for re-insertion into the memory device 12.

The output character store 29 can include one or more registers arranged and operated in response to timing and control information received from the timing and control unit 20 over lead 25 to store for given time periods the six-bit coded characters received from the memory device 12. The six-bit characters held in the registers are applied in parallel form and in a given sequence from the output character store 29 to a digital-to-video signal generator 32 over connections represented by lead 33. The digital-to-video signal generator 32, which can be constructed in the manner of the block diagram shown in FIG. 2 to be described, is operated in response to timing and control information received from the timing and control unit 20 over connections represented by leads 34, 35 to translate the received six-bit coded characters into a video signal. The video signal produced by the digital-to-video signal generator 32 is mixed with the horizontal and vertical drive pulses supplied by the television sync generator 21 over connections represented by lead 36 in a mixer 37 and fed to the control grid of a conventional cathode ray tube in the monitor 10.

The six-bit coded characters stored in digital form in the memory device 12 and included in a data message selected for display on the monitor 10 by the message select signal generator 26 are read-out of the money device 12 and are translated by using only digital techniques into a video signal suitable for direct application to a standard television monitor 10. It is not required that the data message be either stored in analogue form or that it be translated into an analogue form before display as a message page on the tube of the television monitor 10.

Figure 2:
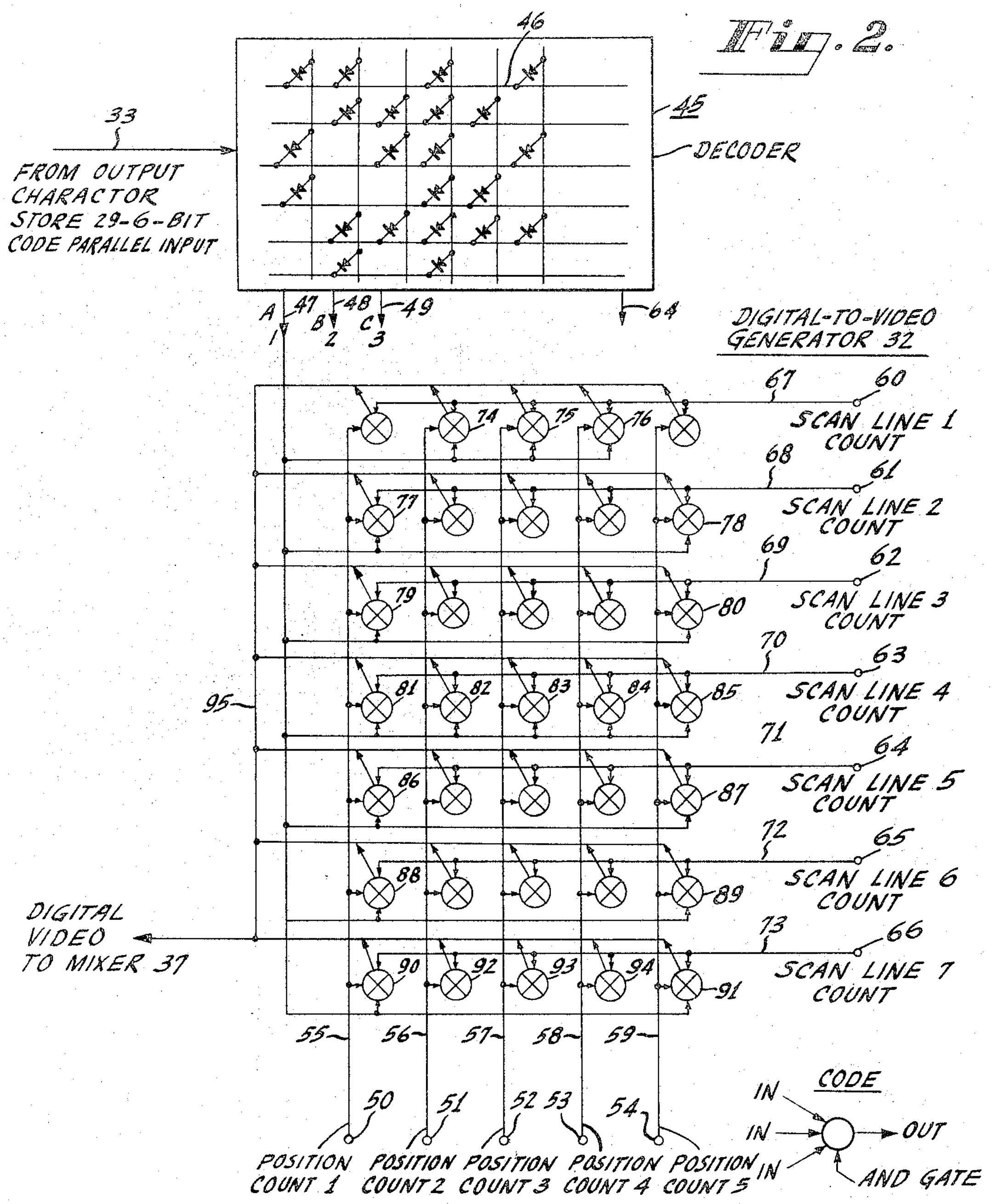
FIGURE 2 is a block diagram of a digital-to-video signal generator which can be used in the embodiment of FIGURE 1.

One example of a digital-to-video signal generator which can be used in the embodiment of FIG. 1 for the digital-to-video generator 32 is shown in the block diagram of FIG. 2. The six-bit coded characters are fed one at a time and in parallel form from the output character store 29 to a binary-to-decimal type of decoder 45 over the lead 33. The decoder 45 which can comprise a diode matrix arrangement 46 as shown in the drawing operates to produce an output signal on only one of a plurality of output leads for each six-bit coded character received from the output character store 29. Assuming that the six-bit coded character representing the letter A is received, the decoder 45 produces an output signal only on output leads 47 assigned to that particular character. The reception of the six-bit coded character for the letter B results in an output signal being produced only on the next output lead 48. An output signal is produced on a third output lead 49 for each six-bit coded character received corresponding to the letter C, and so on. Since a six-bit code is assumed, up to sixty-four different characters are available. Sixty-four different output leads from the decoder 45 corresponding to the sixty-four different characters are indicated in the drawing.

In addition to the decoder 45, the digital-to-video signal generator 32 is shown in FIG. 2 as including an array of multiple input gating circuits. As indicated by the code accompanying FIG. 2, an array of thirty-five AND gates is provided arranged in seven rows and five columns. Five input terminals 50 through 54 are shown along the bottom of the array. The first input terminal 50 is connected over lead 55 to an input of each of the seven AND gates in the first column of the array, reading from left to right. The next input terminal 51 is connected over lead 56 to an input of each of the seven AND gates in the second column of the array. Similarly, the remaining three input terminals 52 through 54 are connected to an input of the seven AND gates in the third, fourth and fifth columns of the array over leads 57, 58 and 59, respectively.

A group of seven input terminals 60 through 66 are shown to the right of the AND gate array. The input terminal 60 is connected by lead 67 to an input of each of the five AND gates in the first row of the array, reading from top to bottom. The next input terminal 61 is connected by lead 68 to an input of each of the five AND gates in the second row of the array. Similarly, the remaining input terminals 62 through 66 are connected to an input of the five AND gates in the third through seventh rows of the array by leads 69 through 73, respectively.

The output lead 47 of the decoder 45 is connected to an input of the second, third, and fourth AND gates 74 through 76 in the first row of the array; an input of the first and fifth AND gates 77 and 78 in the second row of the array; an input of the first and fifth AND gates 79 and 80 in the third row of the array; an input of the first, second, third, fourth and fifth AND gates 81 through 85 in the fourth row of the array; an input of the first and fifth AND gates 86 and 87 in the fifth row of the array; an input of the first and fifth AND gates 88 and 89 in the sixth row of the array; and an input of the first and fifth AND gates 90 and 91 in the seventh row of the array. While the actual connections are not shown in FIG. 2 to avoid unnecessary complexity in the drawing, the remaining sixty-three output leads of the decoder 45 each assigned to a different character are connected to an input of selected ones of the AND gates in the manner of the lead 47 assigned to the letter character A.

In order to avoid a large number of input connections to the AND gates from the sixty-four output leads of the decoder 45, an arrangement of OR gates, not shown, is preferably provided with a single connection from the output of the OR gate arrangement to each of the AND gates. For example, the lead 49 assigned to the letter C is connected to an OR gate along with the lead 47 assigned to the letter A with the output of the OR gate being connected to the AND gate 76. Similarly, signals on the leads 47 and 49 are applied through separate OR gates to inputs of the AND gates 74 and 75 in the first row of the array; inputs of the AND gates 77 and 78 in the second row of the array; an input of the AND gate 79 in the third row of the array; an input of the AND gate 81 in the fourth row of the array; an input of the AND gate 86 in the fifth row of the array; and inputs of the AND gates 88 and 89 in the sixth row of the array. The lead 49 is also connected via OR gates to an input of each of the second, third and fourth AND gates 92, 93 and 94, respectively, in the seventh row of the array. The other output leads of the decoder 45 are connected through OR gates to the inputs of selected ones of the AND gates in the array in a similar manner. The output of each of the thirty-five AND gates in the array is connected to a single output lead 95 from the array.

A typical switching matrix is provided by the array of AND gates shown in FIG. 2. Each gate has at least three inputs. A first input is connected to one of the input terminals 60 through 66, a second input is connected to one of the input terminals 50 through 54, and a third input is connected via OR gates to the decoder 45. In order for one of the AND gates to produce an output defined as a change in the level of the output signal from that AND gate, it is necessary that the three inputs to the AND gate all be at a given signal level. In the absence of the simultaneous occurrence of the given input signal levels, no output is produced by the AND gate. By applying the proper signal levels to the input terminals 50 through 54 and to the input terminals 60 through 66, first one and then another of the AND gates in the array can be interrogated in a desired sequence as to the condition of the input to the AND gates from the decoder 45. An output signal is produced on the output lead 95 including serially appearing time periods during which the output signal is at either one of two levels, for example, ground or −6 volts, determined by the operation of the respective AND gates in the array when individually interrogated during the time periods.

Figure 3:
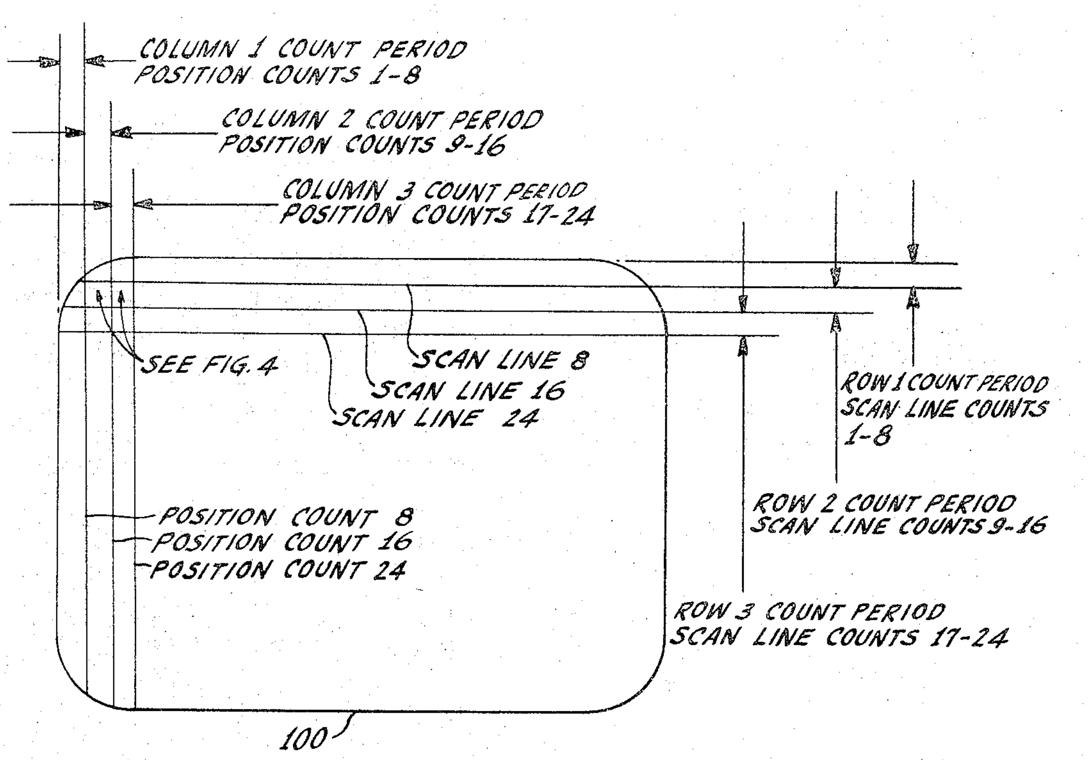
FIGURES 3 and 4, taken together, are a graphic illustration of the manner in which characters can be displayed on the television monitor in the operation of the embodiment shown in FIGURE 1.
Figure 4:
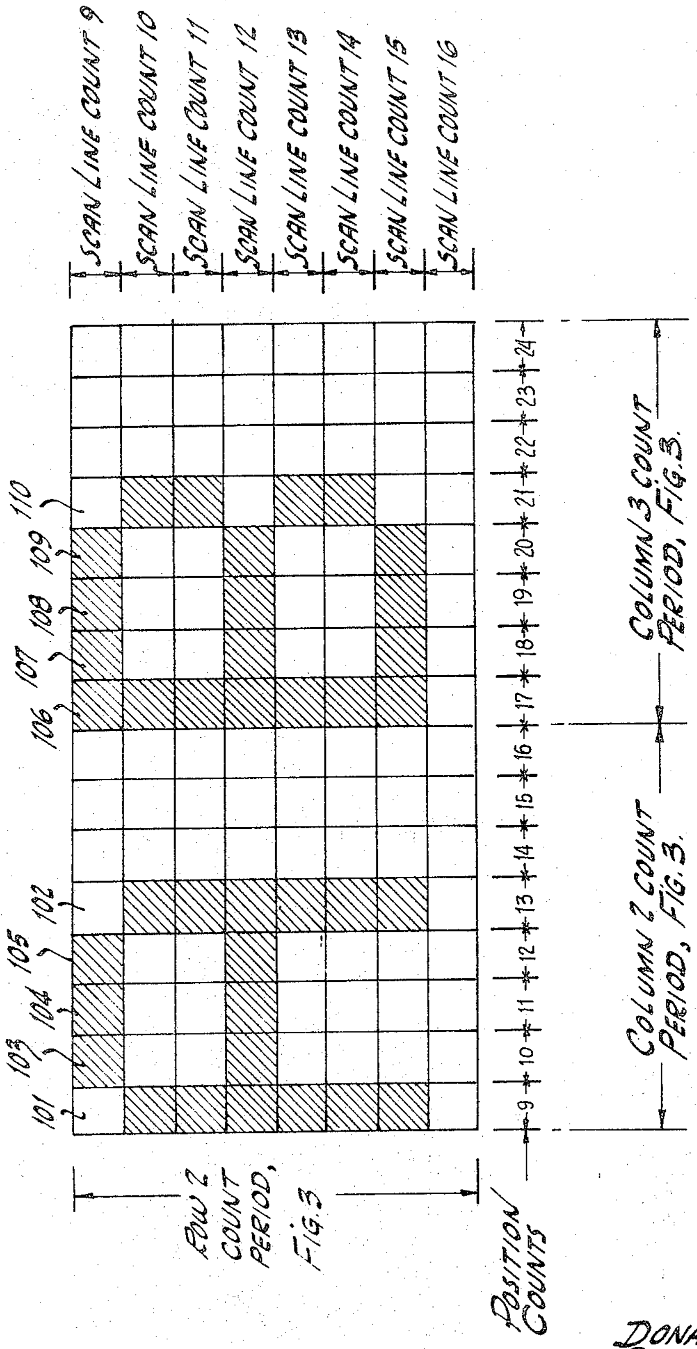

Before describing a typical operation of the embodiment shown in FIGS. 1 and 2 in displaying a data message on the monitor 10, reference is made to the graphic illustrations in FIGS. 3 and 4 which show how the display of a received data message as a message page on the face of the monitor 10 can be completed. The face 100 of a conventional cathode ray television tube as would be used in the standard television monitor 10 of FIG. 1 is shown in FIG. 3. Considering the tube face 100 as being divisible into time periods, the tube face 100 is shown as being divided in the vertical or Y-direction into equal row count periods. Each row count period includes eight scan line counts corresponding to eight complete horizontal sweeps across the tube face 100. The tube face 100 is shown as being further divided in the horizontal or X-direction into equal column count periods. Each column count period includes eight position counts corresponding to eight positions of the cathode ray beam as it sweeps across the tube face 100.

It has been assumed that the data processing system is to provide for the display as a message page either one of two data messages each including up to 512 six-bit coded characters. The coded characters will include letter characters, numeric characters, functional characters such as space, and miscellaneous other characters as might be needed in a particular application. A location must be provided for each of the 512 coded characters on the tube face 100. It will be assumed that the characters in each of the data messages are to be displayed in sixteen rows of thirty-two characters each. The tube face 100 is divided in the X-direction into thirty-two column count periods with the intersection of a column count period and row count period corresponding to the location of one character. A minimum of sixteen row count periods are needed to complete the display of the data message.

The particular manner in which the characters are displayed on the tube face 100 is shown more clearly in FIG. 4. FIG. 4 represents the character display taking place at the intersection of the row 2 count period and the column 2 and column 3 count periods shown in FIG. 3. It is assumed that the letter A is displayed at the intersection of the row 2 count period and the column 2 count period. Within this intersection, the beam of the television tube partially completes eight scan lines, numbered nine through sixteen, with eight position counts numbered nine through sixteen, taking place during each of the eight scan lines or horizontal sweeps. During the first five position counts, numbered nine through thirteen, in each of the first seven scan lines, numbered nine through fifteen, the electron beam carries information as to the make-up of the letter character A, resulting in the display of the character on the tube face 100. During the remaining three position counts, numbered fourteen through sixteen, in each of the seven scan lines, numbered nine through fifteen, no information is carried by the beam resulting in the production of an open or blank spacing of three position counts between the letter A and the next character to be displayed during the row 2 count period. During the remaining one of the scan lines in the row 2 count period, numbered sixteen, the beam as it completes the eight position counts, numbered nine through sixteen also carries no information as to character display.

The display of the letter B is assumed at the intersection of the row 2 count period and column 3 count period. The operation follows from that described above. During the first five position counts of the character location, numbered seventeen through twenty-one, of each of the first seven scan lines, numbered nine through fifteen, the beam of the cathode ray tube carries information as to the character B. During the remaining three position counts, numbered twenty-two through twenty-four, of the seven scan lines, numbered nine through fifteen, and during the eight position counts, numbered seventeen through twenty-four, of the last or eighth scan line, numbered sixteen, no information is carried by the beam. The operation is similar during each intersection of the remaining thirty column count periods and the row 2 count period, a total of thirty-two column count periods intersecting the row 2 count period.

A similar operation also takes place as the beam completes the eight scan line counts of the remaining row count periods. There are eight position counts for each scan line count at each of the thirty-two character locations included in a row count period. Therefore, a total of two hundred and fifty-six position counts exist in each scan line count of each of the row count periods. Since the data message is assumed to require for the printing of the characters on the display, a minimum of sixteen row count periods which each include eight scan line counts, at least one hundred and twenty-eight scan line counts or horizontal sweeps are needed to print the message in the example given. As more clearly brought out in the below description of a typical operation of the embodiment shown in FIGS. 1 and 2, it is preferable for easy reading that a blank or open row count period be provided between each row count period in which characters are printed. The number of scan line counts required to complete the message page display is therefore doubled to two hundred and fifty-six.

It will be understood that the time sequence of the above events is as follows: scan line number one through all its position counts from one through two-hundred and fifty-six, horizontal flyback, scan line number two through all its position counts from one through two-hundred and fifty-six, horizontal flyback, scan line number three, and so on, to the bottom of the display, followed by vertical flyback. One scanning line is carried completely across the tube face 100 before the next is started.

In the operation of the embodiment shown in FIGS. 1 and 2 to produce a television display as described in connection with FIGS. 3 and 4, the television sync generator 21 is assumed to be of a conventional construction arranged to produce horizontal drive pulses having a frequency of 15,750 cycles per second and vertical drive pulses having a frequency of 30 cycles per second for a non-interlaced operation. Reference has been made to four timing functions, namely, row count periods, scan line counts, column count periods and position counts. The timing and control unit 20 is responsive to the television sync signals from the television sync generator 21 to generate these timing functions at the proper frequency. Since a horizontal drive pulse frequency of 15,750 cycles per second for operating the television monitor 10 is assumed, the frequency of the scan line counts is set at 15,750 cycles per second. There are eight scan line counts per row count period so that the frequency of the row count periods is approximately 2,000 cycles per second. Thirty-two column count periods corresponding to character locations occur for each scan line count, making the frequency of the column count periods equal to thirty-two times the scan line count frequency of 15,750 cycles per second or 504,000 cycles per second. Since there are eight position counts per column count period, the frequency of the position counts becomes approximately 4 mc. (megacycles).

Considering first the write-in operation of the data processing system, two general approaches are possible. When it is desired to write newly received coded characters into the memory device 12, one approach is to interrupt a display operation then in process, write in the new coded characters, and then resume the display operation with the newly stored coded characters or with coded characters previously stored. However, there are applications where it is desired that the display not be interrupted. In the later case, the write-in operation should in some way be synchronized with the read-out operation so that a non-interrupted display operation results.

In the approach providing for an interrupted display, a data message received at the input terminal 11 is processed by the data input unit 13. The data input unit 13 generates a proper write address signal for application to the X-addresser 14 and the Y-addresser 15. Any operation occurring at this time by the memory device 12 in providing stored coded characters for display is halted by the application of appropriate control signals from the data input unit 13 to the timing and control unit 20 via lead 22. The timing and control unit 20 applies a write-into-memory signal to the data input unit 13 over lead 22, whereupon the data input unit 13 proceeds to forward the coded characters in the received data message to the memory device 12 over lead 19. Since it is not necessary that the write-in operation be synchronized with the display operation, the row count signals supplied to the Y-addresser 15 from the timing and control unit 20 via lead 23 and the column count signals supplied to the X-addresser 14 from the timing and control unit 20 via lead 24 need not be of the particular frequencies set forth above but can be under control of the incoming data signal.

The X-addresser 14 and the Y-addresser 15 are responsive to the write address signal and to the proper timing and control information received from the timing and control unit 20 via leads 23 and 24 to produce the necessary signals locating the areas in the memory device 12 into which the incoming six-bit coded characters are to be written. The memory device 12 functions in response to the signals received from the X-addresser 14 and Y-addresser 15 and to read-write control signals received from the timing and control unit 25 over lead 25 to properly store the six-bit coded characters applied thereto. Following the completion of the write-in operation, the memory device 12 can be operated by the application of the proper instructions thereto to supply for display either the newly stored coded characters or coded characters previously placed in the store.

In the second approach where a non-interrupted display is to be provided, the insertion into memory may be synchronized to the display operation. The timing and control unit 20 supplies a row count signal of approximately 2,000 cycles per second to the Y-addresser 15 over lead 23 and a column count signal of 504,000 cycles per second to the X-addresser 14 over lead 24. Each scan line on the television monitor 10 is approximately sixty-two and one-half microseconds long. Ten microseconds of this time is devoted to flyback time during which no coded character intelligence is required from the memory device 12. The timing of the X-addresser 15, Y-addresser 14, and the memory device 12 in response to the timing and control information received from the timing and control unit 20 is, therefore, determined so that a single, six-bit coded character is written into the memory device from the data input 13 during the flyback time of each scan line, resulting in the coded characters being written into the memory device 12 at a frequency of substantially 15,750 characters per second. In this manner, the information stored in the form of six-bit coded characters in the memory device 12 can be continuously updated without interrupting the display operation.

While two general approaches have been described for writing coded characters into the memory device 12, other approaches employed in the art may be used as well. Whether one of the approaches described above or some other approach is used, it is only necessary for present purpose that the memory device 12 and the write-in circuits associated therewith be such that the memory device 12 can be operated to store in digital form a plurality of coded characters. It has been assumed that the memory device 12 is one capable of storing two different data messages each including up to 512 six-bit coded characters.

In reading out of the memory device 12 the six-bit coded characters included in a data message selected for display as a message page on the television monitor 10, the message select unit 27 is operated by the message select signal generator 26 to generate the proper read address signal defining the location in the memory device 12 of the coded characters needed to complete the display. The timing and control unit 20 operates to supply the row count signal having a frequency of approximately 2,000 cycles per second to the Y-addresser 15 over lead 23 and the column count signal having a frequency of 504,000 cycles per second to the X-addresser 14 over lead 24. The memory device 12 is operated in response to the timing and control information received from the timing and control unit 20 over lead 25 and in response to the instructions received from the Y-addresser 15 over lead 18 and from the X-addresser 14 over lead 17 to provide at its output the six-bit coded characters to be displayed.

During each active scanning line the memory device 12 supplies at its output the thirty-two six-bit coded characters corresponding to the thirty-two characters to be reproduced as a given row on the message page, so the characters appear one at a time at the output of the memory device 12 at a frequency of 504,000 cycles per second. These data are repeated six times, so they are available to the video generator 32 during the seven scanning lines required to print a row of characters. The memory device 12 is programmed to complete sixteen such separate and independent cycles of operation per message, corresponding to the sixteen rows of characters needed to complete the message page on the monitor 10.

Assuming that the memory device 12 is operated in response to a read address signal produced by the message select unit 27 to complete the first of the sixteen cycles of operation during which it supplies at its output the thirty-two six-bit coded characters forming the first row of characters on the message page selected for display, the six-bit coded characters are fed to the output character store 29 which includes an arrangement of one or more six-bit coded character storage devices. The character storage devices can, for example, take the form of shift registers or similar circuit arrangements, and function to make the coded form of one character continually available to the video generator 32 while the memory device 12 is producing the coded form of the next. As the coded characters are fed to the output character store 29 from the memory device 12, they are also fed to the regenerator 31. The regenerator 31 serves to write the coded characters back into the memory device 12, providing a non-destructive read-out operation for the memory device 12.

By way of example, the memory device 12 can be one having a read-write cycle of 1.5 microseconds, where the read-write cycle is defined as the time required for the memory device 12 to read a coded character destructively out of a given location therein and to write into that location a newly received coded character. Alternatively, the memory device 12 can be permitted a longer operating period by reading out more than one character at a time to the output character store 29. For example, 12 memory planes might be used with two characters being simultaneously read out in a three microsecond period or 18 memory planes provided with three characters being simultaneously read out in a 4.5 microsecond period, and so on.

The electron beam in the cathode ray tube of the television monitor 10 is assumed to scan the tube face 100 shown in FIG. 3 from left to right. At the beginning of a raster scan, the beam is at the topmost left hand corner of the tube face 100. In order to leave a blank or open space at the top of the tube face 100, the beam is operated by the horizontal and vertical drive pulses supplied from the sync generator 21 via lead 36 to complete the first eight scan lines, numbered one through eight, of the row 1 count period with no video signal being supplied to the monitor tube 10 from the digital-to-video signal generator 32 at this time. The beam next begins the first scan line, numbered nine, of the row 2 count period. In order to provide a margin at the left hand side, no video signal is fed to the monitor 10 as the beam completes the first eight position counts, numbered one through eight, of the scan line, which correspond to the column 1 count period.

At this point in the operation, the six-bit coded character corresponding to the first character in the first row of characters to be displayed at the intersection of the row 2 count period and column 2 count period is read out of the proper character storage device in the output character store 29 and fed to the digital-to-video signal generator 32. The first character is indicated in FIGS. 3 and 4 as the letter A. The six-bit coded character corresponding to the letter A is received by the binary-to-decimal decoder 45 shown in FIG. 2 which generates a change in the signal level on the lead 47 assigned to that particular character. The timing and control unit 20 supplies one of the scan line counts occuring at the frequency of 15,750 cycles per second to the digital-to-video signal generator 32 over lead 34 shown in FIG. 1. The scan line count is translated into a change in the signal level applied to the input terminal 60 shown in FIG. 2.

At the same time, the timing and control unit 20 functions to supply the five position counts corresponding to the position counts numbered nine through thirteen occurring at a frequency of approximately 4 mc. and shown in FIG. 4 to the digital-to-video signal generator 32 over lead 35 shown in FIG. 1. The five position counts are fed individually and in sequence to the input terminals 50 through 54 shown in FIG. 2. The five AND gates arranged in the first row of the AND gate array also shown in FIG. 2 are interrogated in turn. Since lead 47 is connected to the second, third and fourth AND gates 74, 75, and 76, respectively, in the first row, only these AND gates conduct. A serially appearing, binary signal 01110 having a frequency of approximately 4 mc. appears on the output lead 95 of the AND gate array for application to the monitor 10. This binary signal is translated by an on-off control of the electron beam of the monitor 10 into the top horizontal line section of the letter A on the tube face 100 with the "0" bit intervals resulting in the unshaded or white dots 101, 102 and the "1" bit intervals resulting in the shaded or black dots 103, 104 and 105. By way of example, the signal level on the output lead 95 may be switched between ground for the "0" bit intervals and −6 volts for the "1" bit intervals.

The electron beam of the monitor 10 continues across the tube face 100 past the next three position counts, numbered fourteen through sixteen, in FIG. 4. As these position counts occur, no video signal is applied to the monitor tube from the digital-to-video signal generator. During this period, the six-bit coded character corresponding to the letter A is removed from the input to the decoder 45, and the six-bit coded character corresponding to the second character in the first row of characters is read out of the proper character storage device in the output character store 29 and fed to the decoder 45 in the digital-to-video signal generator 32. The second character is assumed to be the letter B. A change in signal level is generated by the decoder 45 on lead 48 shown in FIG. 2 as assigned to this particular character. The proper signal level remains applied to the input terminal 60 so that the application to the input terminals 50 through 54 shown in FIG. 2 of the five position counts corresponding to the position counts numbered seventeen through twenty-one in FIG. 4 results in the interrogation of first one and then another of the five AND gates included in the first row of AND gates of the array also shown in FIG. 2. A binary signal 11110 appears on the lead 95 which is applied to the monitor 10 and appears on the tube face 100 as the shaded or black areas 106, 107, 108, 109 and the unshaded or white area 110 shown in FIG. 4.

As the electron beam continues the first scan line, numbered nine, of the row 2 count period, no video signal is applied to the monitor tube during the position counts numbered twenty-two through twenty-four. The six-bit coded character corresponding to the second character in the first row of characters is replaced at the input to the decoder 45 by the six-bit coded character corresponding to the third character in the first row of characters. The operation continues in the manner described for each of the thirty-two characters included in the first row of characters. A complete scan line or horizontal sweep signal is generated by the digital-to-video signal generator 32 and applied to the monitor 10. The scan line signal includes information as to a single horizontal section of each character in the row of characters to be displayed.

At the end of the first scan line, numbered nine, in the row 2 count period, the electron beam returns to the left hand side of the tube face 100 and begins the second scan line, numbered ten, in the row 2 count period. The six-bit coded character corresponding to the first character in the first row of characters, assumed to be the letter A, is again applied to the digital-to-video signal generator 32 from the memory device 12 via the output character store 29. The next or second row of five AND gates in the AND gate array of the digital-to-video generator 32 are made permissive by the reception from the timing and control unit 20 of the next cycle of the 15,570 cycles per second scan line count signal which is translated into the proper change in signal level at the input terminal 61. As the electron beam of the monitor 10 passes over position counts numbered nine through thirteen in FIG. 4, a binary signal 10001 representing the next horizontal section of the letter A appears on the output lead 95 of the AND gate array and is applied to the monitor 10. During the position counts numbered seventeen through twenty-one in FIG. 4, a binary signal 10001 representing the next horizontal section of the letter B appears on the output lead 95 for application to the monitor 10. In this manner, a video signal is generated by the digital-to-video signal generator 32 and applied to the monitor 10 as the electron beam therein completes the second scan line or horizontal sweep of the row 2 count period with the video signal including information as to the second horizontal section of each character in the row of characters to be displayed.

The above operation is repeated as the electron beam in the monitor 10 completes the next five scan lines of the row 2 count period, numbered eleven through fifteen in FIG. 4. As the third scan line is completed, numbered eleven in FIG. 4, the proper signal level is applied to the input terminal 62 of the AND gate array shown in FIG. 2, resulting in the third row of five AND gates being interrogated to produce a video signal including binary information as to a third horizontal section of each of the thirty-two characters in the row. As the electron beam completes the seventh scan line, numbered fifteen in FIG. 4, the proper signal level is applied to the input terminal 66 of the AND gate array, resulting in the seventh row of AND gates being interrogated to produce a video signal including binary information as to the seventh or last horizontal section of the thirty-two characters in the row.

At this time, the first row of thirty-two characters in the message is completely displayed on the tube face 100. The electron beam completes an eighth scan line, numbered sixteen in FIG. 4, of the row 2 count period during which no video signal is applied to the monitor 10 from the digital-to-video generator 32. The eighth scan line is provided to simplify the logic since the even eight count is more readily handled using digital techniques than would be an odd seven count. Since the eighth scan line in the row count period is not actually necessary to the display of characters, it can be eliminated if desired by proper circuit design.

The electron beam in the monitor 10 now proceeds to complete the eight scan line counts, numbered seventeen through twenty-four in FIG. 3, of the row 3 count period. No video signal is applied to the monitor 10 as the scan line counts of the row 3 count period are completed. This is done to provide a spacing or blank between the first row of characters and the second row of characters displayed on the message page, making for easy reading.

When the electron beam of the monitor 10 is in position to complete the first scan line count of the row 4 count period, number twenty-five of the two hundred and fifty-six scan line counts needed to complete the display, the six-bit coded character corresponding to the first character in the second row of characters is in the output character store 29 ready to be processed by the digital-to-video signal generator 32 into a video signal for application to the monitor 10. The electron beam in the monitor 10 thereafter completes in succession the eight scan lines of the row 4 count period. As the beam completes each of the scan line counts, a video signal is generated and fed to the monitor 10 including information as to a given horizontal section of each of the thirty-two characters in the second row. At the completion of the seventh scan line count in the row 4 count period, the characters in the second row are completely displayed.

The operation is similar in completing the remaining fourteen rows of characters on the message page display. The operation is timed so that a blank space corresponding to a row count period appears between successive rows of characters. When the sixteenth row of characters is completed during the row 32 count period, a complete display of the data message has been formed. The electron beam of the monitor 10 is thereafter returned to the top of the tube face 100 in response to a vertical drive pulse to begin a new sweep across the tube face 100. The sequence of operations necessary to complete the display of the sixteen rows of characters on the tube face 100 are repeated as in a typical television operation to provide a continuous, visible display for the operator at the monitor 10.

The operator can at any time change the particular data message displayed as a message page on the monitor 10. By properly operating the message select signal generator 26, either one of the two messages assumed to be stored by the memory device 12 can be selected for display. The operation remains as described, regardless of the data message selected. A system for the storage and generation of video signals using only digital techniques is thus provided. The same logic modules as are used in the construction of the digital, computer-type memory device 12 and associated circuits can be used in the construction of the circuits for translating the stored digital signals into a form suitable for television display.

While the storing for selective display of only two data messages each including up to 512 six-bit coded characters has been assumed, the invention is not limited to such an application. By properly determining the size of the memory device 12 and the design of the logic circuits associated therewith, any number of data messages including any desired number of characters having any desired code length per message can be processed. The data messages need not be all of the same character length. Instead of displaying a complete one of the stored data messages, the memory device 12 can be programmed so that only a selected portion of a stored data message is displayed or a selected portion of each of a plurality of the stored data messages is displayed. The data display system described in flexible in performance, facilitating the use of a wide range of computer techniques in its operation.

In describing the operation of the embodiment shown in FIGS. 1 and 2, various frequencies and other parameters have been assumed. They can be changed according to the needs of a particular application. Having determined in a particular application the number of characters per row, as well as the number of rows of characters to be displayed, the various frequencies can be chosen in the same logical manner as in the example given. On the basis of the particular frequencies and parameters presented above and assuming the use of a twenty-three inch television monitor 10, the resulting characters on the tube face 100 will be approximately five-sixteenths ($\frac{5}{16}$) of an inch high. The actual size of the characters can be changed to fit the needs of a particular application by providing more or less scan line counts and more or less position counts for each character location on the tube face 100. The number of AND gates and the arrangement of AND gates in the array of he digital-to-video signal generator 32, shown by way of example in FIG. 2, can be determined to provide the necessary amount of information per scan line which will result in the display of a character having the desired size as the scan lines included in a row count period are completed.

Several advantages are gained by the use of the raster scan television operation described. Since the horizontal deflection is always of the same length in completing the display, the deflection can be of the energy conserving type. The deflection means is of a simple construction, consumes less power and generates less heat than is the case of systems where the deflection means must follow some sort of an irregular pattern. The raster scan operation described permits keeping the wide band video signals at the low energy levels required for a grid drive of the monitor 10.

The use of the raster scan operation also facilitates the use of the data display system described in applications where some type of overlapping display is needed. It may be desired to display the characters of the received data message against a background in the form of a map, a scene or other configuration. A television camera or other photo-slide pick-up means, not shown, is provided for generating the background signal. The background signal is fed through a gate, not shown, to the mixer 37 shown in FIG. 1 for display on the monitor 10. The gate can be controlled from the digital-to-video signal generator 32 so that the background signal is blocked or removed during those periods in which characters are displayed. Because each scan line extends completely across the tube face 100, a simple arrangement as described above can be used to produce a combined display signal with a minimum amount of visible distortion due to the overlapping of the character and background information.

Reference has been made to a non-interlace television operation. An odd-even interlace operation can be used as well. 60 cycle vertical drive pulses are supplied by the television sync generator 21. The digital-to-video signal generator 32 is operated to produce video signals corresponding only to the odd scan lines as the electron beam of the monitor tube completes one passage across the tube face 100, and to produce video signals corresponding only to the even scan lines as the beam completes the next passage across the tube face 100. Conventional television techniques can be used to complete the interlaced display.

The monitor 10 can be arranged for color display. The coded characters received and stored by the memory device 12 in such an application each include bit intervals arranged in a code defining the color of the character. When the characters are read out of the memory device 12 for display, the bit intervals defining the color of each character are fed to a decoder, not shown. The decoder operates an arrangement of gates, not shown, for routing the video signals generated by the digital-to-video signal generator 32 to the control elements of a color tube included in the monitor 10 so as to complete the display in the desired colors.

What is claimed is:

1. A display system for generating character patterns for display on a display device that exhibits a television raster scan-line pattern, each character pattern being displayed in one character space, means responsive to a certain character code for applying to a certain selected lead an output signal having a duration substantially equal to the scanning time in said scan-line direction through one character space, means for generating scan-line select counts in synchronism with the scan-lines of said raster, each scan-line count having a duration substantially equal to that of a raster scan-line, means for generating position counts which occur successively during a scan along a scan-line through a character space, and means for causing said output signal appearing on said selected lead, said scan-line counts and said position counts to supply to said display device a selected character pattern.

2. In a system for displaying a message comprising certain character patterns on a display device that exhibits a television raster scan-line pattern, wherein each different character pattern is manifested by a digitally coded data signal corresponding thereto, the improvement comprising generating means responsive to the data signal forming said message applied thereto for digitally generating a video signal for use in displaying said message on said display device, and means for applying said data signals forming said message to said generating means.

3. The improvement defined in claim 1, wherein said generating means includes first means for producing as said video signal a signal which selectively has either a first level or a second level for the entire duration of each respective one of successive elemental time intervals all of which have the same predetermined duration, the duration of each television raster scan line being an integral multiple of said predetermined duration, and second means coupled to said first means for selecting which of said first and second levels, respectively, exists during each respective one of said successive elemental time intervals in accordance with the data signals forming said message.

4. The improvement defined in claim 2, wherein said first means comprises a single two dimensional matrix of two state switchable elements functionally arranged in rows and columns, each of said switchable elements normally being in a certain one of its two states and being capable of being switched to its other state in response to the coincidence of first and second switching signals applied thereto only if an enabling signal is also applied thereto, first cyclically-operated means for sequentially applying said first signal to each row of said matrix in order for a period which is isochronous with a scan line period of said television raster, and second cyclically-operated means for sequentially applying said second signal to each column of said matrix in order for a period equal to said elemental time interval, said second cyclically-operated means operating through a given plural integral number of consecutive cycles thereof during each scan line period, and wherein said second means comprises prewired means for selectively enabling different sets of switchable elements of said matrix in accordance with the data signal then being applied.

5. The improvement defined in claim 4 wherein said means for applying said data signals to said generating means comprises means for applying a first given data signal to said generating means for the entire duration of the same one particular ordinal cycle of said consecutive cycles occurring in all of a certain number of successive scan line periods and for applying a second given data signal to said generating means for the entire duration of the same other particular ordinal cycle of said consecutive cycles occurring in all of said certain number of successive line scan periods.

6. The improvement defined in claim 2, wherein said means for applying said data signals includes a data input unit, a memory coupled to said data input unit for storing the data signals manifesting the characters of each of a plurality of different messages, and message select means coupled to said memory for non-destructively reading out from said memory the data signals forming a selected one of said messages, said data signals read out from said memory being applied to said generating means.

References Cited

UNITED STATES PATENTS 3,017,625 1/1962 Evans ------------- 340—324

JOHN W. CALDWELL, *Acting Primary Examiner.*

DAVID G. REDINBAUGH, *Examiner.*

G. W. BRITTON, *Asistant Examiner.*

UNITED STATES PATENT OFFICE

CERTIFICATE OF CORRECTION

Patent No. 3,345,458 October 3, 1967

Donald A. Cole et al.

It is hereby certified that error appears in the above numbered patent requiring correction and that the said Letters Patent should read as corrected below.

Column 3, line 55, for "receeived" read -- received --; column 5, line 41, for "money" read -- memory --; column 14, line 28, for "he" read -- the --; column 15, line 44, for the claim reference numeral "1" read -- 2 --; column 16, line 4, for the claim reference numeral "2" read -- 3 --.

Signed and sealed this 29th day of October 1968.

(SEAL)
Attest:

Edward M. Fletcher, Jr.
Attesting Officer

EDWARD J. BRENNER
Commissioner of Patents